US006842808B2

(12) United States Patent
Weigl et al.

(10) Patent No.: US 6,842,808 B2
(45) Date of Patent: Jan. 11, 2005

(54) DATA EXCHANGE BETWEEN USERS CONNECTED BY A BUS SYSTEM AND HAVING SEPARATE TIME BASES

(75) Inventors: Andreas Weigl, Linkenheim-Hochstetten (DE); Thomas Fuehrer, Gerlingen (DE); Bernd Müller, Leonberg (DE); Florian Hartwich, Reutlingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 09/754,439

(22) Filed: Jan. 4, 2001

(65) Prior Publication Data

US 2001/0018720 A1 Aug. 30, 2001

(30) Foreign Application Priority Data

Jan. 5, 2000 (DE) .......................................... 100 00 303

(51) Int. Cl.[7] .......................... G06F 13/36; G06F 13/62
(52) U.S. Cl. ........................ 710/117; 710/110; 710/124; 710/314; 710/60; 710/61; 713/500; 713/501; 713/502; 713/503
(58) Field of Search ........................ 710/110, 104–107, 710/117, 124, 58–61, 314, 29–35, 8–10, 15–18; 713/500–503

(56) References Cited

U.S. PATENT DOCUMENTS 5,448,561 A * 9/1995 Kaiser et al. ................ 370/471
5,600,782 A * 2/1997 Thomson ......................... 714/4
6,167,061 A * 12/2000 Nakatsugawa ............... 370/480
6,370,593 B1 * 4/2002 Larson ............................ 710/1
6,442,708 B1 * 8/2002 Dierauer et al. .............. 714/25
6,532,506 B1   3/2003 Dunstan et al.
6,539,443 B1 * 3/2003 Dunstan et al. ............. 710/106
6,542,947 B1 * 4/2003 Buhring ....................... 710/107
6,548,969 B2 * 4/2003 Hennings et al. ............. 318/34
6,549,972 B1 * 4/2003 Berstis et al. ................ 710/311
6,606,670 B1 * 8/2003 Stoneking et al. ............ 710/14
6,665,601 B1 * 12/2003 Nielsen ........................ 701/50
6,751,688 B1 * 6/2004 El-Demerdash et al. ...... 710/67
6,779,138 B2 * 8/2004 Nagaura et al. .............. 714/49

* cited by examiner

Primary Examiner—Paul R. Myers
Assistant Examiner—Raymond N. Phan
(74) Attorney, Agent, or Firm—Kenyon & Kenyon (57) ABSTRACT

A method and device for the exchange of data in messages between at least two users which are connected by a bus system and have separate time bases, the messages containing the data being transmitted by the users via the bus system; and a first user, in a function as timer, controls the messages as a function of time in such a way that it repeatedly transmits a reference message, which contains time information regarding the time base of the first user, via the bus at a specifiable time interval; the at least second user forms its own time information, using its time base, as a function of the time information of the first user; a correction value is ascertained from the two pieces of time information; and the second user adapts its time information and/or its time base as a function of the correction value.

8 Claims, 6 Drawing Sheets

Drift correction
(Block diagram)

DATA EXCHANGE BETWEEN USERS CONNECTED BY A BUS SYSTEM AND HAVING SEPARATE TIME BASES

FIELD OF THE INVENTION

The present invention relates to a method and a device for the exchange of data between at least two users (nodes) connected to a bus system.

BACKGROUND INFORMATION

As related art in automotive networking, the CAN (controller area network) protocol has been used for several years. In that case, the communication is controlled in an event-driven manner. Very great loads can be produced when the transmission of various messages is to be initiated at the same time. The non-destructive arbitration mechanism of CAN guarantees the sequential transmission of all messages according to the priority of their identifiers or identifications. For hard real-time systems, an analysis of the transit times and bus loads for the entire system must be made in advance, to make sure that all message deadlines can be observed (even under peak load).

There are already communication protocols which are based on time-controlled processing, such as TTP/C or Interbus-S. The exceptional feature in this case is that the bus access is already planned in advance by allocating transmission instants. Thus, no collisions can occur during the transit time. However, in the same way, a peak load is avoided on the communications bus. Thus, the bus is frequently not completely utilized to capacity.

When working with such time-controlled systems—systems having distributed clocks—synchronization mechanisms are necessary and known, such as synchronization to level changes of individual bits, etc.

Because of this, intervals are frequently necessary between individual messages to compensate for tolerances, thus reducing the efficiency of the bus capacity utilization.

It is apparent that the related art is unable to deliver optimal results in every respect.

SUMMARY OF THE INVENTION

Thus, the present invention includes a method and a device for the exchange of data in messages between at least two users which are connected by a bus system and have separate time bases, the messages containing the data being transmitted by the users via the bus system; and a first user, in a function as timer, controls the messages as a function of time in such a way that it repeatedly transmits a reference message, which contains time information regarding the time base of the first user, via the bus at a specifiable time interval; the at least second user forms its own time information, using its time base, as a function of the time information of the first user; a correction value is ascertained from the two pieces of time information; and the second user adapts its time information and/or its time base as a function of the correction value.

In this context, the CAN bus is used particularly expediently as the basic bus system or bus protocol. However, the present invention relates generally to any bus system or bus protocol in which an object-oriented message transfer or data transfer is used, thus the message and/or the data contained therein are clearly recognizable by an identifier. Consequently, this is valid for all busses in which not the users, but rather the messages or their data are addressed, in particular the CAN bus.

The messages are advantageously controlled by a first user as a function of time in such a way that the first user repeatedly transmits a reference message via the bus at at least one predefinable time interval, and the time interval is subdivided into timing windows of specifiable length, the messages being transmitted in the timing windows.

Therefore, compared to the related art, the present invention advantageously includes a higher protocol layer with respect to the actual bus (CAN) protocol which is retained unchanged within the framework of the time-controlled communication according to the present invention. Thus, the time-controlled communication advantageously allows full capacity utilization of the bus, and at the same time makes it possible to hold the latency times for each message to a defined value.

The present invention therefore includes a cyclically proceeding transfer of bus (CAN) messages. In this manner, a deterministic and combinable communication system is produced. Such a system is subsequently referred to as TTCAN in the present invention. Furthermore, in the same way, the starting point is a CAN bus, the considerations being valid generally for all bus systems or bus protocols having object-oriented message transfer, as mentioned above.

The reference message and the subsequent timing windows up to the next reference message are expediently combined to form a first cycle of specifiable length and/or specifiable structure, the structure corresponding to the length, number and time position of the timing windows in the time interval which follow the reference message.

Furthermore, a plurality of first cycles of the same structure are advantageously combined to form a second cycle, messages in the second cycle also being repeatedly transmitted in timing windows whose time interval is greater than the time length of the first cycle.

One cyclical message transfer is expediently omitted in at least one timing window of the first or the second cycle. In these initially empty timing windows, it is then possible to transfer arbitrating messages, thus such which do not have to be transmitted cyclically, but rather are available when, for example, certain sequences are concluded.

Each first cycle is advantageously started with a reference message, and the at least second user determines an interval of its time base with respect to the time base of the first user. Consequently, the correction value can expediently be ascertained from the difference of two intervals of the time bases of the at least two users.

In this manner, it is advantageously possible to adjust the accuracy of the local clocks distributed in a TTCAN system, in order to synchronize transmission instants and reception instants more precisely than in the related art.

Another advantage is that, because of this, the clocks in the individual stations can exhibit a greater tolerance of accuracy (cheaper components, particularly oscillators) between the synchronization intervals.

Expediently, the first cycles or base cycles (interval between two reference messages) can become greater, resulting in a rise in efficiency of the bus capacity utilization.

It is also advantageous that the length of a base cycle is no longer limited by the tolerance of the individual clocks, and that the intervals between the individual messages (so-called inter-frame gaps), necessary in other methods to compensate for tolerances, may be omitted.

DETAILED DESCRIPTION

TTCAN is based essentially on a time-controlled, periodic communication which is clocked by a timer (node, user) with the aid of a time-reference message, or reference message RN for short. The period up to the next reference message RN is denoted as base cycle and is subdivided into n timing windows (see FIG. 2). Each timing window allows the exclusive transmission of one periodic message of variable length. These periodic messages are transmitted in a TTCAN controller by using timing marks which are coupled to the expiration of a logical relative time. However, TTCAN also allows the consideration of vacant timing windows. These timing windows can be used for so-called spontaneous messages, the access within these timing windows to the bus being utilized via the arbitration scheme of CAN (arbitrating messages). The synchronization of the timer clock (global time gZ) with the internal local time of individual nodes 1Z1 through 1Z4 is taken into account and efficiently converted.

Figure 1:
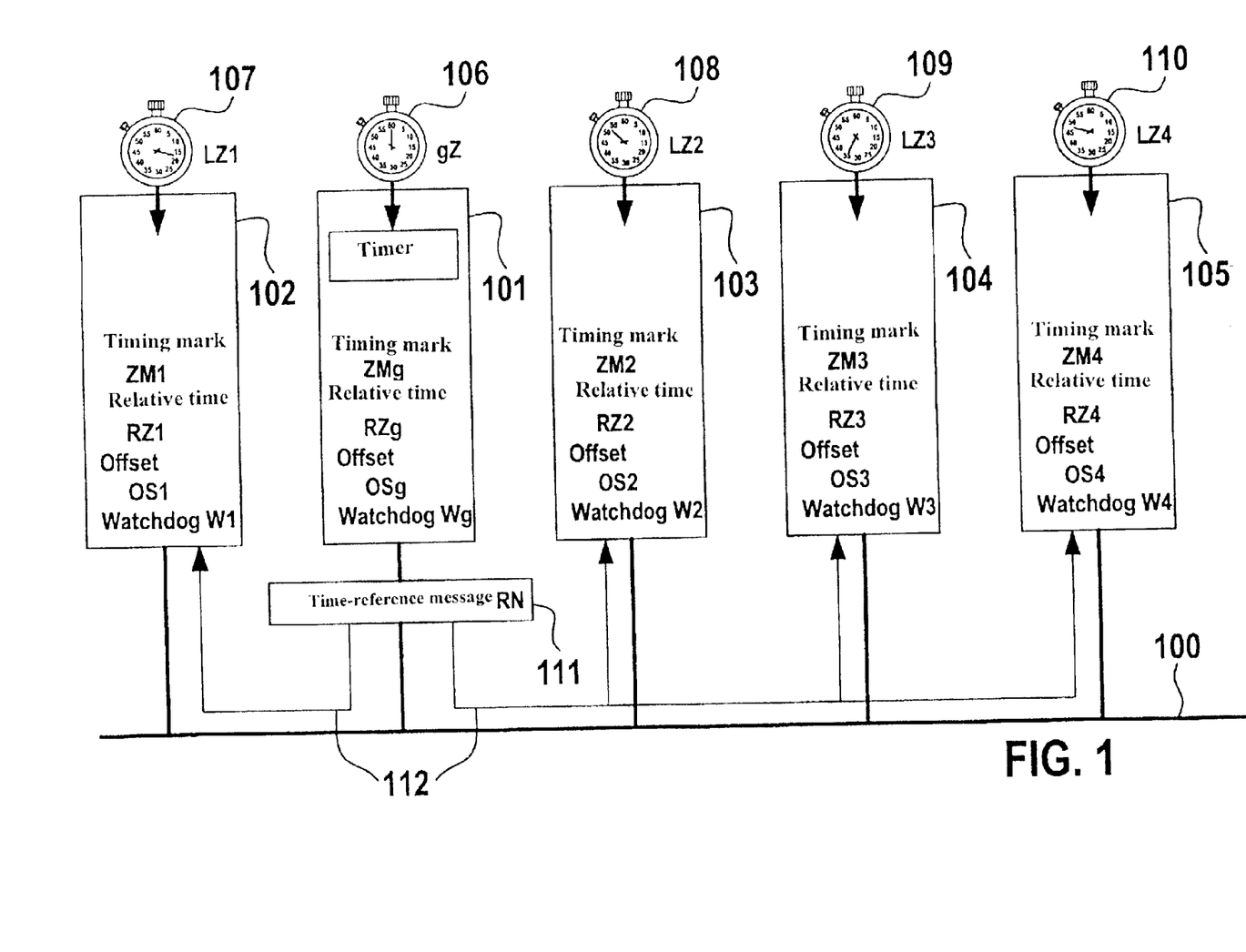
FIG. 1 shows schematically a bus system having a plurality of users.

FIG. 1 shows a bus system 100 having a plurality of bus users 101 through 105. In this context, each user 101 through 105 has a separate time base 106 through 110 which can be transmitted, on the one hand, by an internal element such as a clock, counter, clock generator, etc., or externally to the respective user. The respective local time base 1Z1 through 1Z4 is, in particular, a counter, for example, a 16-bit incrementing counter, which may only be influenced by a HW reset. In this instance, the local time base is implemented in each node or user 102 through 105. One user, the timer, 101, has an exposed setting. Its time base is designated as global time base 106 having global time gZ, and is either implemented in timer 101, or is transmitted to it externally. Global time gZ is formed in principle in each node from local time base 107 through 110, i.e. local time 1Z (1Z1 through 1Z4) and an offset OS1 through OS4. As a rule, this offset OSg for timer 101 is equal to zero (OSg=0). All other nodes form their view of global time gZ from local time 1Z (1Z1 through 1Z4) and local offset OS1 through OS4 and OSg, when OSg≠0. The case when OSg is not zero occurs, for example, when global time gZ is transmitted from the outside to timer 101 which, in addition, contains its own time base 106. Then, the timer is also calibrated to global time gZ, and gZ and time base 106 may not agree. The local offset is the difference between the local time at the transmission instant (SOF, start of frame) of the reference message, and the global time transmitted by the timer in this reference message.

Local Time Base and the Global Time

Local Time Base: The local time base is a counter, such as a 16-bit incrementing counter, which may only be influenced by a HW reset. The local time base is implemented in each node.

Reference-Mark Buffer Register: In response to each assumed SOF, the buffer register is loaded with the local time base.

Reference Marker: If the instantaneous message is recognized as a reference message, then the value is retrieved from the buffer register into the reference marker (as local reference mark). The reference marker is configured, for example, as a 16-bit register.

Timer Reference Mark: This is the reference mark of the timer received by the time takers in the reference message.

Local Offset With Respect To the Global Time: The local offset to the global time is the difference between the reference mark in the buffer register and the global timing mark received in the reference message. It is used for calculating the global time from the local time. The offset of the timer itself remains constant. The timer transmits its local reference mark plus the local offset in the reference message.

Thus, timer 101 is also that node or user which transmits time-reference message 111, i.e., reference message RN for short. Arrow 112 indicates that reference message RN 111 is dispatched, especially simultaneously, to remaining users 102 through 105.

Reference message RN is the basis for the time-controlled, periodic operation of TTCAN. It is clearly denoted by a special identifier, and is received by all nodes, here 102 through 105, as clock generator. In principle, it is sent out cyclically by timer 101. The reference message can include the following data: The number of the instantaneous base cycle BZn, the reference mark of the timer in global time.

The reference mark is formed by the takeover of the internal counter reading at the instant of the "start of frame" bit (SOF) upon reception of the reference message of the timer. Thus, the reference mark is an instantaneous recording of the local time base at the instant of receiving the reference message. Relative time RZ1 through RZ4 and RZg specified in the users is the difference between the local time base and the last reference mark. All definitions with regard to the timing marks used relate to the relative time of an individual user. For example, it can be permanently available as a signal (e.g., by combining the two register values via gates). The reference mark determines the relative time of all nodes on the TTCAN bus.

Watchdog Wg and W1 through W4, likewise shown, is a special relative instant. Such a relative instant (watchdog)—at which a new reference message, and thus a reference mark, as well, is expected at the latest—is defined in each node. Therefore, the watchdog represents a special timing mark. The watchdog is used primarily in the initializing and re-initializing to monitor whether a communication has taken place at all. In this case, the watchdog should always be greater then the interval between the reference messages.

In this context, one timing mark is a relative instant which establishes the relationship between the relative time and an action in the original bus (CAN) controller. One timing mark is represented as register, a controller having the ability to manage a plurality of timing marks. A plurality of timing marks can be allocated to one message (see, for example, in FIG. 4: transmission group A occurs both in timing window ZF1a, and in timing window ZF4a).

With regard to the application, an application watchdog is actuated in particular. This watchdog is employed regularly by the application in order to signal the proper operation to the TTCAN controller. The messages are sent by the CAN controller only when this watchdog is actuated.

Figure 2:
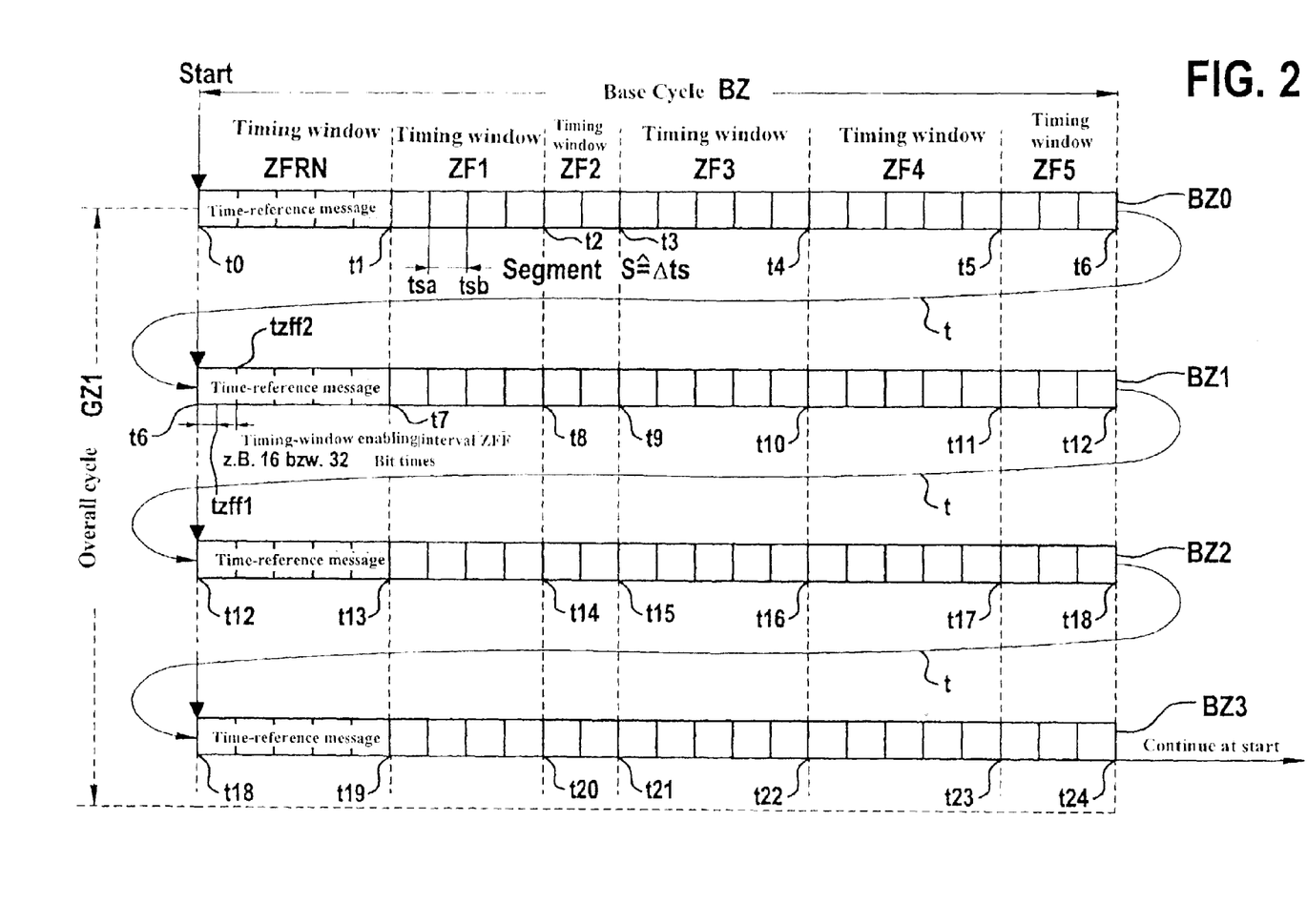
FIG. 2 shows the sequence in principle of the first cycles or base cycles and the second cycles, the overall cycles over time.

FIG. 2 shows the principle of the time-controlled, periodic message or data transfer over time. This message transfer is clocked by the timer with the aid of the reference message. Time interval t0 through t6 is designated as base cycle BZ and is subdivided into k timing windows (k ∈ N). Reference messages RN of respective base cycles BZ0 through BZ3 are transmitted from t0 to t1, t6 to t7, t12 to t13 and t18 to t19, thus in timing window ZFRN. The structure of timing windows ZF1 through ZF5 following a reference message RN, thus their length (in segments S, where Δts=tsb−tsa), their number and their time position, is specifiable. In this manner, an overall cycle GZ1 which begins at t0 and ends at t24, to be run through anew, can be formed from a plurality of base cycles of the same structure. For example, the timing windows include 2 to 5 segments having, for instance, 32 bit times each. The number of timing windows is, for example, 2 to 16, only one timing window or more than 16 also being possible. The number of base cycles in an overall cycle is $2^m$, for instance, where, in particular m≦4.

By way of example, tzff1 and tzff2 denote two transmission enabling intervals or timing-window enabling intervals which, for instance, last 16 or 32 bit times and describe the time frame within which it is possible to begin with the transmission of the message with respect to the base cycle.

Figure 3:
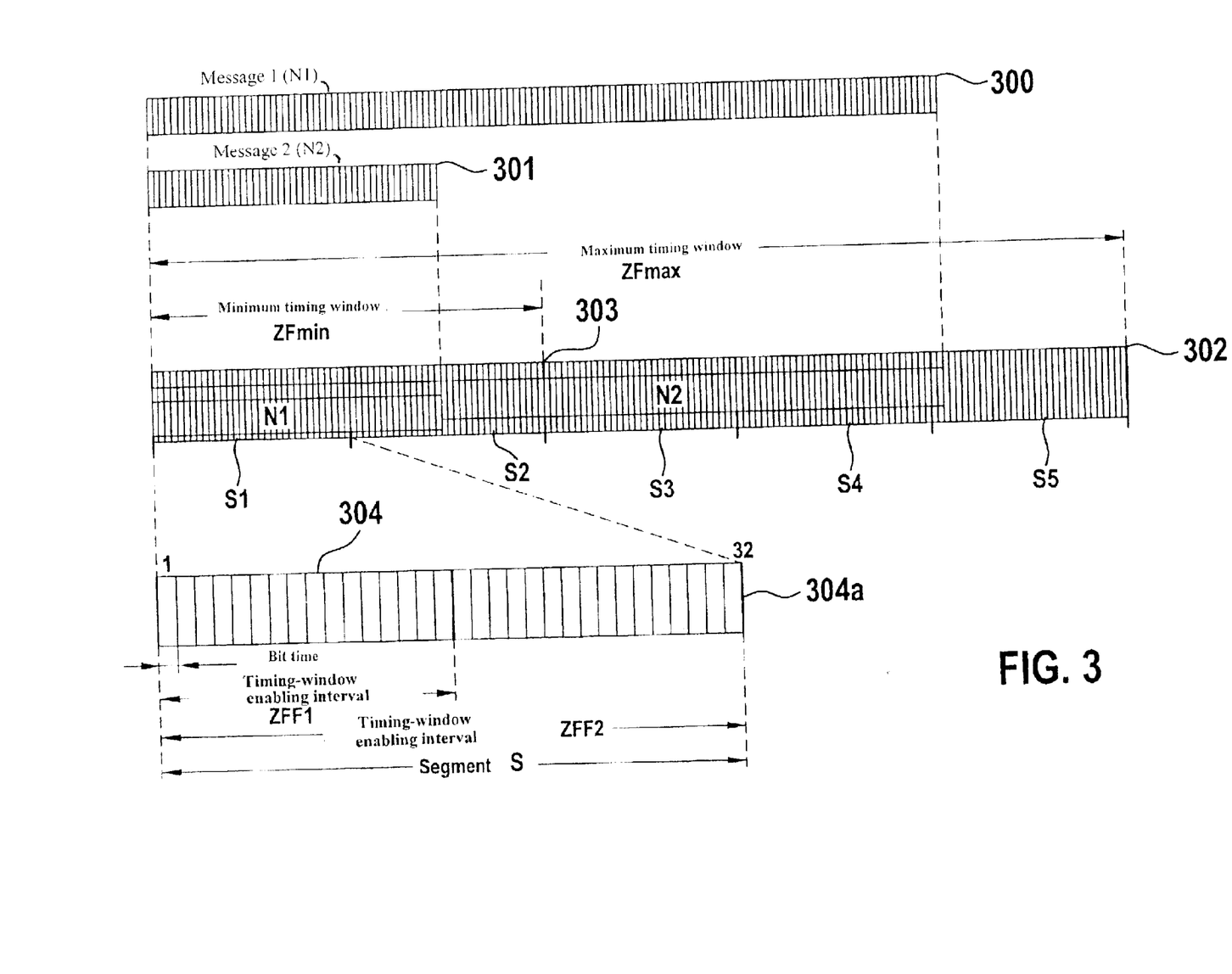
FIG. 3 illustrates in detail the design and message occupancy of the timing windows.

Each timing window allows the exclusive transmission of a periodic message of variable length. By way of example, FIG. 3 shows two messages of different length and the allocation in the timing window. For instance, message 1 (N1) as block 300 contains 130 bits, and message 2 (N2) as block 301 contains 47 bits.

As already mentioned, maximum and minimum timing windows can be predefined as a function of the message length, for instance, between 2 and 5 segments per timing window in this example. Thus, a maximum timing window ZFmax is predefined as block 302 which includes 5 segments (S1 through S5) having 32 bit times each, and a minimum timing window ZFmin is predefined as block 303 which includes 2 segments (S1 and S2) having 32 bit times each. Messages N1 and N2 are transmitted in them, the messages thus not having to completely fill up the timing windows; rather, the timing-window sizes are specified according to the message length. Therefore, ZFmax offers sufficient time or place for the longest possible message, e.g. 130 bits or bit times, and ZFmin can be adapted to the shortest possible message, e.g. 47 bits.

In general, the timing window is the time frame available for a specific message (see FIG. 3). The timing window of a message is opened with the application of the proceed-to-send signal, and the beginning of this window agrees in principle with a defined timing mark. The length of the timing window is determined from i segments having, for example, 32 bit times (see block 304*a*). In this context, the segmenting at, in particular, 32 bit times represents a HW-friendly size. The timing window may not be shorter than the longest message occurring in this timing window. The bit time is, in particular, the nominal CAN bit time.

The transmission enabling interval or timing-window enabling interval describes the time frame within which the transmission of the message may be started. The transmission enabling interval is a part of the timing window. Thus, the proceed-to-send is applied in the interval timing mark and timing mark plus delta. The value delta is perceptibly smaller than the length of the timing window (e.g., 16 or 32 bit times for ZFF1 or ZFF2). A message whose beginning does not lie within the transmission enabling interval may not be sent.

Figure 4:
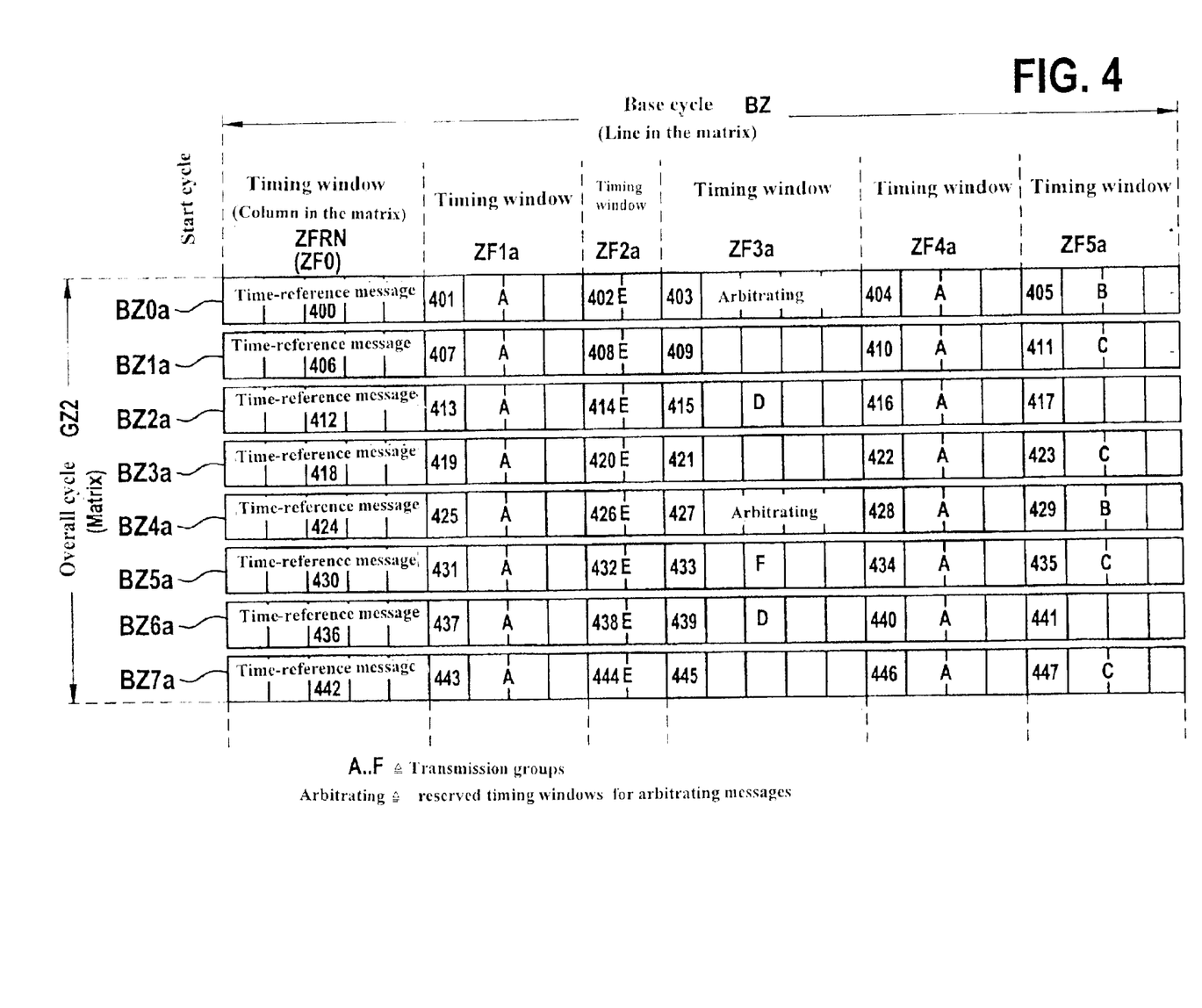
FIG. 4 shows an overall cycle having 7 base cycles and diverse transmission groups of messages, as well as arbitrating messages.

FIG. 4 now represents an overall cycle (transmission matrix) GZ2.

Overall Cycle (Transmission Matrix):

All messages (RN, A through F and arbitrating) of all users are organized as components of a transmission matrix (see FIG. 4). The transmission matrix is made up of individual base cycles BZ0*a* through BZ7*a*. All base cycles of overall cycle GZ2 have the same structure. These base cycles can be composed selectively from exclusive (A through F) and arbitrating components. The total number of lines (thus base cycles BZ0*a* through BZ7*a*) here is a number $2^m$=8, where m=3.

One base cycle (line of the transmission matrix) begins with a reference mark in reference message RN and is composed of a plurality (i) of successive timing windows of defined length (first timing window ZF0, i.e., ZFRN for RN). The arrangement of the messages within the base cycle can be freely established. A timing window is linked for exclusive components to a CAN message object. A timing window can also be left free (409, 421, 441, 417, 445) or be used for arbitrating components (403, 427).

Messages which are always sent in the same timing window but in different base cycles form a transmission group (column of the transmission matrix, A through F) (see FIG. 4). Consequently, a period can be established, e.g., A in ZF1*a* and ZF4*a*: 401, 407, 413, 419, 425, 431, 437, 443 and 404, 410, 416, 422, 428, 434, 440, 446. One message object (of a timing window) can be sent repeatedly within a transmission group. The period of a message within a transmission group is a number 2, where 1<=m.

The message object, i.e., the message, corresponds to the message object of the bus, particularly in CAN, and includes the identifier, as well as the data itself. In TTCAN, the message object is supplemented by at least one, preferably by all three, of the following entries in the transmission matrix: timing window, base mark, rate of repetition.

The timing window is the position (ZF0, ZF1*a* through ZF5*a*) in the base cycle (BZn, line of the transmission matrix). The beginning of the timing window is defined by reaching a specific timing mark.

The base mark indicates in which base cycle (BZ0*a* through BZ7*a*) in the overall cycle the message is sent first. The rate of repetition defines after how many base cycles this transmission is repeated.

To indicate the validity of a message object for the CAN controller, there is a "permanent transmission request" which signifies a permanent enabling of the object (for exclusive components, see below) and an "individual transmission request" which signifies a one-time validity of the object (for arbitrating components, see below).

The automatic retransmission from CAN is advantageously deactivated for the messages in TTCAN.

In the following, the message transfer—periodic messages and spontaneous messages—in the base cycle or in the overall cycle, particularly with respect to the application, is now described again. In so doing, exclusive messages, thus periodic messages, and arbitrating, thus spontaneous messages, are again differentiated.

Exclusive Message Objects (Periodic Messages):

Exclusive message objects are sent when the application watchdog is set, the "permanent transmission request" of the application is set at the CAN controller, and the transmission enabling interval of the appertaining timing window is open. In this case, the timing mark for the message object agrees with the relative time. The permanent transmission request remains set until it is reset by the application itself.

Arbitrating Message Objects (Spontaneous Messages):

Arbitrating message objects are sent when the application watchdog is set, the "individual transmission request" of the application is set at the CAN controller, and the transmission enabling interval of the next timing window specified for this is open. The timing mark for this timing window is then equal to the relative time. The transmission request is reset after successful transmission by the CAN controller. The simultaneous access of various spontaneous messages is regulated via the bit arbitration of CAN. If a spontaneous message in this timing window loses versus another spontaneous message, then it can first fight again for bus access in the next timing window specified for this.

If the entire transmission matrix, i.e. the overall cycle is run through, then a cyclical, time-controlled message transmission is yielded. Time-controlled means that each action uses, as a point of departure, the attainment of a specific instant (see timing marks and relative time). If the overall cycle is run through completely, i.e., all base cycles were processed once, then a start is made again with the first base cycle of the transmission matrix. No time gaps arise in the transition. An overview of such a time-controlled communications system with timer has been presented in the description and the figures of the Drawing.

Figure 5:
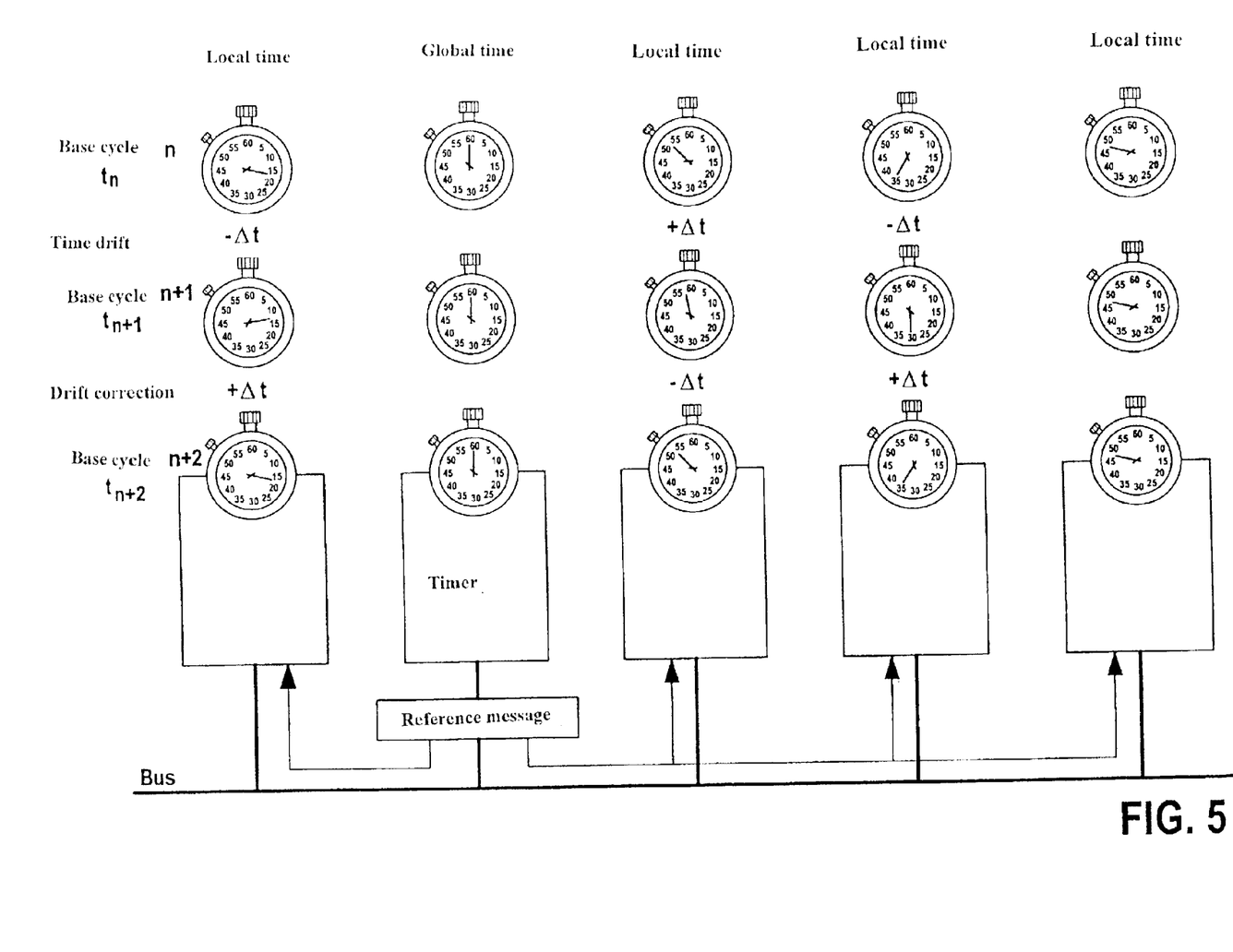
FIG. 5 shows, by analogy with FIG. 1, the correction (drift correction) of the local time bases or time information.

By analogy with FIG. 1, FIG. 5 shows a system having users and a bus system. In this context, a time drift of local times or time bases is determined in a base cycle n beginning at instant tn. The drift correction is then effected in the following base cycle n+1 beginning with tn+1. The times or time bases are then corrected in the next base cycle n+2 beginning with tn+2.

Figure 6:
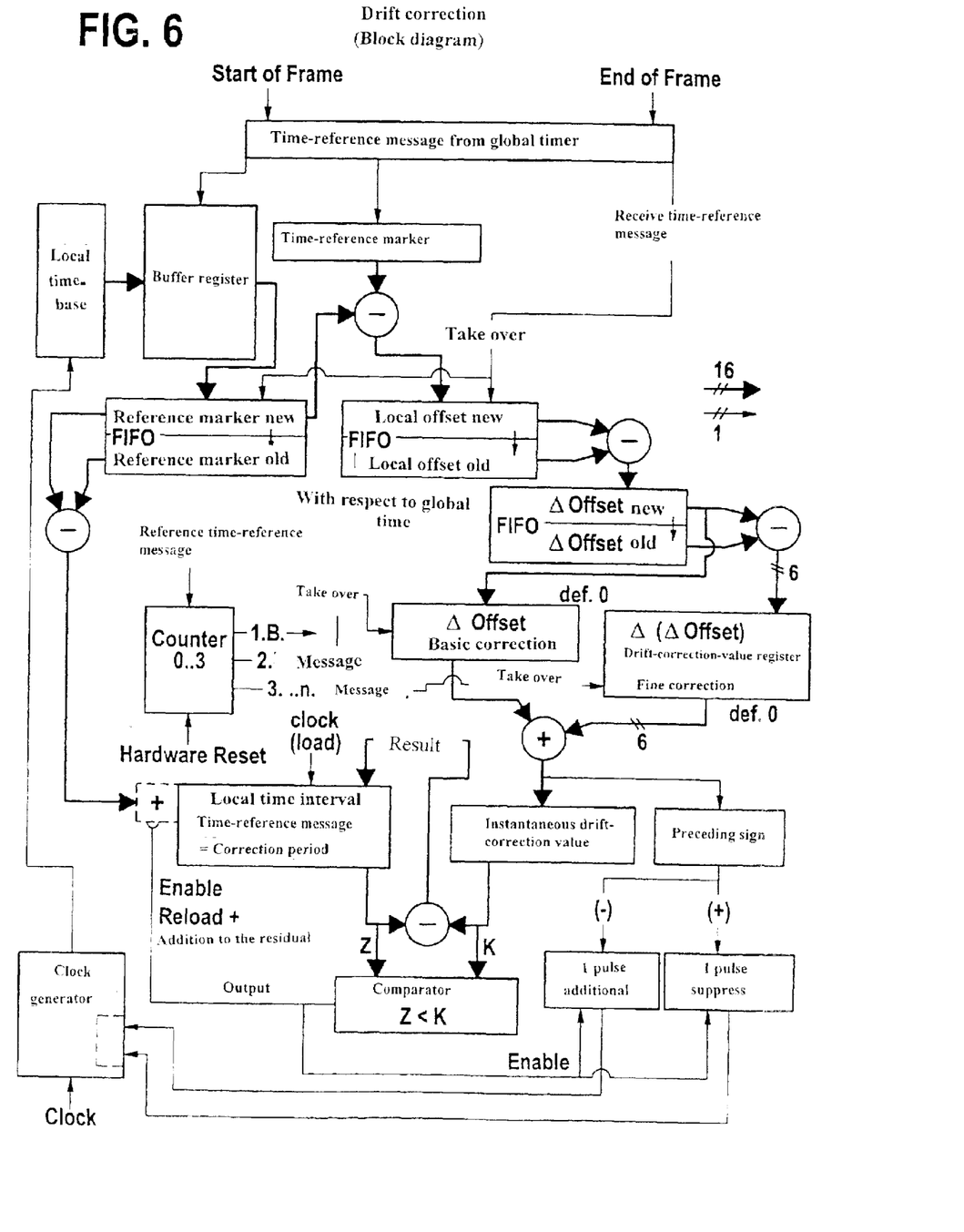
FIG. 6 shows in detail, in the form of a block diagram, an example for the drift correction itself. This block diagram can be implemented in hardware and/or software.

FIG. 6 now shows in detail a drift correction according to the present invention. Each node (TTCAN controller) includes:

a local oscillator which, together with a counter, indicates the local time;

a reference marker in which the local time is buffered upon reception of a reference message. The reference marker is advantageously designed as a double FIFO;

a local offset register (double FIFO) which contains the difference between the local reference mark and the timer reference mark;

an offset difference register which contains the difference of the last two offsets;

a drift-correction-value register which contains the correction value with which the local timer is subsequently corrected;

a correction-period register.

In a TTCAN system, each base cycle is started with a reference message in which a time reference is stipulated, and each node determines the interval of its local time with respect to this reference.

A local deviation is calculated from the difference of the intervals of two base cycles and placed in relationship to the total time, from which a basic correction value is calculated for the local time. This basic correction value can be refined, in that for each further base cycle, the difference of the local deviation is also used for the correction.

For simple conversion of the algorithm in hardware or software, the usually necessary quotient formation can be replaced during a correction period (base cycle) by an examination as to how often the correction value is contained in the correction period. This can be done, for example, by a repeated subtraction of the correction value from the correction period in a suitable register, until the residual amount is smaller than the subtrahend. Thereupon, an additional counting pulse is inserted or left out depending on the preceding sign of the correction-value change. The difference between the last two local reference marks is added to the remaining residual amount.

Thus, when working with a steady-state system, a synchronization to +/− one bit time over a base cycle is possible.

The terms time-reference message and reference message are synonymous.

What is claimed is:

1. A method for an exchange of data in messages between at least two users connected by a bus system and having separate time bases but operating a same bus speed, comprising:

causing the at least two users to transmit data via the bus system in the messages, the at least two users operating at the same bus speed;

causing a first one of the at least two users, in a function as timer, to control the messages as a function of time such that the first one of the at least two users repeatedly transmits a reference message including a first time information regarding a time base of the first one of the at least two users, via the bus system at a specifiable time interval;

causing at least a second one of the at least two users to form a second time information in accordance with a time base of the at least second one of the at least two users, as a function of the first time information;

ascertaining a correction value from the first time information and the second time information; and causing the at least second one of the at least two users to adapt as a function of the correction value at least one of the second time information and the time base of the at least second one of the at least two users, whereby the at least two users continue to operate at the same bus speed.

2. The method according to claim 1, further comprising:

subdividing the specifiable time interval into timing windows of a specifiable length; and transmitting the messages including the data in the timing windows.

3. A method for an exchange of data in messages between at least two users connected by a bus system and having a separate time bases, comprising:

causing the at least two users to transmit data via the bus system in the messages;

causing a first one of the at least two users, in a function as timer, to control the messages as a function of time such that the first one of the at least two users repeatedly transmits a reference message including a first time information regarding a time base of the first one of the at least two users, via the bus system at a specifiable time interval;

causing at least a second one of the at least two users to form a second time information in accordance with a time base of the at least second one of the at least two users, as a function of the first time information;

ascertaining a correction value from the first time information and the second time information;

causing the at least second one of the at least two users to adapt as a function of the correction value at least one of the second time information and the time base of the at least second one of the at least two users;

subdividing the specifiable time interval into timing windows of a specifiable length;

transmitting the messages including the data in the timing windows; and combining the reference message and subsequent ones of the timing windows up to a next reference message to form a first cycle of at least one of the specifiable length and a specifiable structure, wherein:

the specifiable structure corresponds to the specifiable length, number, and time position of the timing windows in the specifiable time interval following the reference message.

4. The method according to claim 3, further comprising:

combining a plurality of first cycles of a same specifiable structure to form a second cycle; and repeatedly transmitting messages in the second cycle in timing windows having a time interval greater than a time length of the first cycle.

5. The method according to claim 3, further comprising:

starting each first cycle with the reference message; and causing the at least second one of the at least two users to determine an interval of the time base of the at least second one of the at least two users with respect to the time base of the first one of the at least two users.

6. The method according to claim 1, further comprising:

ascertaining the correction value from a difference of the specifiable time interval of the first one of the at least two users and another time interval of the at least second one of the at least two users.

7. The method according to claim 1, further comprising:

omitting a cyclical message transfer in at least one timing window of one of a first cycle and a second cycle; and transmitting arbitrating messages in the at least one timing window.

8. A device for an exchange of data in messages between at least two users connected by a bus system and having separate time bases but operating at a same bus speed, comprising:

an arrangement for causing the at least two users to transmit data via the bus system in the messages, the at least two users transmitting the data at the same bus speed;

an arrangement for causing a first one of the at least two users, in a function as timer, to control the messages as a function of time such that the first one of the at least two users repeatedly transmits a reference message including a first time information regarding a time base of the first one of the at least two users, via the bus system at a specifiable time interval;

an arrangement for causing at least a second one of the at least two users to form a second time information in accordance with a time base of the at least second one of the at least two users, as a function of the first time information;

an arrangement for ascertaining a correction value from the first time information and the second time information; and an arrangement for causing the at least second one of the at least two users to adapt as a function of the correction value at least one of the second time information and the time base of the at least second one of the at least two users, wherein the at least two users continue to operate at the same bus speed.

\* \* \* \* \*